United States Patent
Ratti et al.

(10) Patent No.: US 6,782,739 B2
(45) Date of Patent: Aug. 31, 2004

(54) METHOD AND SYSTEM FOR MONITORING THE DEFORMATIONS OF A TIRE IN MOTION

(75) Inventors: Alessandro Ratti, Como (IT); Renato Caretta, Gallarate (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 09/959,250

(22) PCT Filed: Feb. 20, 2001

(86) PCT No.: PCT/EP01/01919

§ 371 (c)(1),
(2), (4) Date: Jan. 16, 2002

(87) PCT Pub. No.: WO01/62525

PCT Pub. Date: Aug. 30, 2001

(65) Prior Publication Data

US 2002/0166371 A1 Nov. 14, 2002

Related U.S. Application Data

(60) Provisional application No. 60/185,708, filed on Feb. 29, 2000.

(30) Foreign Application Priority Data

Feb. 22, 2000 (EP) .............................................. 00103712

(51) Int. Cl.$^7$ .............................................. G01M 17/02
(52) U.S. Cl. .............................................. 73/146; 73/705
(58) Field of Search .............................. 73/146, 705, 146.2, 73/146.4, 146.5; 250/559.29, 559.31, 559.4, 204; 318/577, 640; 356/348, 347, 375, 376, 360, 3.01, 3.03

(56) References Cited

U.S. PATENT DOCUMENTS 3,382,908 A * 5/1968 Palmquist et al. .......... 152/555
4,225,238 A * 9/1980 Rottenkolber ............. 73/146 X
4,918,976 A * 4/1990 Fogal, Sr. ................. 73/146 X
5,247,831 A    9/1993 Fioravanti
5,303,756 A * 4/1994 Hill ........................ 152/154.2
6,298,889 B1 * 10/2001 Smith ........................ 152/151

FOREIGN PATENT DOCUMENTS

DE    39 16 176 A1    11/1990

(List continued on next page.)

OTHER PUBLICATIONS

Celeri, F. et al., "A Method for the Evaluation of the Lateral Stability of Vehicles and Tires," International Automobile Tire Conference, Toronto, Canada, Oct. 22–24, pp. 1–9, (1974).

(List continued on next page.)

Primary Examiner—William Oen
(74) Attorney, Agent, or Firm—Finnegan, Henderson, Farabow, Garrett & Dunner, L.L.P.

(57) ABSTRACT

A system for monitoring deformations of a tire fitted on a rim associated with a vehicle includes a reflecting element positioned on an inner surface of the tire and a moving station located in a predetermined position on the rim. The reflecting element reflects an optical beam and includes a region having at least one area of high light reflection and at least one area of low light reflection. The moving station sends the optical beam toward the inner surface, receives one or more reflections of the optical beam from the inner surface or the reflecting element, and emits a signal proportional to the deformations of the tire in a longitudinal direction, in a transverse direction, and in a vertical direction.

20 Claims, 8 Drawing Sheets

FOREIGN PATENT DOCUMENTS

| | | |
|---|---|---|
| DE | 42 42 109 | 6/1994 |
| DE | 196 40 834 | 4/1998 |
| EP | 0 197 813 | 10/1986 |
| EP | 0 689 950 A2 | 1/1996 |
| EP | 0 887 211 A1 | 12/1998 |
| WO | WO 93/25400 | 12/1993 |
| WO | WO 98/14338 | 4/1998 |
| WO | WO 01/08908 | 2/2001 |
| WO | WO 01/45968 | 6/2001 |

OTHER PUBLICATIONS

Caretta, R. et al., "Method and System for Controlling the Behaviour of a Vehicle by Controlling Its Tyres", U.S. patent application Ser. No.: 09/625,350, filed Jul. 25, 2000.

Caretta, R., "Method and System for Monitoring the Deformations of a Tyre in Motion", U.S. patent application Ser. No.: 60/173,553, filed Dec. 30, 1999.

U.S. patent application Ser. No. 10/149,395, Caretta, filed Jun. 11, 2002.

* cited by examiner

METHOD AND SYSTEM FOR MONITORING THE DEFORMATIONS OF A TIRE IN MOTION

CROSS-REFERENCES TO RELATED APPLICATIONS

This application is a national stage entry under 35 U.S.C. §371 from International Application No. PCT/EP01/01919, filed Feb. 20, 2001, in the European Patent Office; additionally, Applicants claim the right of priority under 35 U.S.C. §119(a)–(d) based on patent application No. 00103712.6, filed Feb. 22, 2000, in the European Patent Office; further, Applicants claim the benefit under 35 U.S.C. §119(e) based on prior-filed, copending provisional application No. 60/185,708, filed Feb. 29, 2000, in the U.S. Patent and Trademark Office; the contents of all of which are relied upon and incorporated herein by reference.

BACKGROUND OF THE INVENTION

1. Field of the Invention

The present invention relates to a method and system for monitoring the deformations of a tyre in motion.

In particular, the present invention relates to the possibility of determining the deformations of the carcass structure of a tire from inside it, for example in order to provide automatic intervention actuated or commanded by the driver, in the driving and/or control system of the vehicle, to change the vehicle's behaviour according to measurements made on the tyre.

2. Description of the Relevant

There are known prior art devices for measuring characteristic parameters such as pressure and temperature inside a tyre.

Patent application EP 887211 describes a tyre monitoring system comprising a sensor which is positioned inside the tyre and is enabled to create an electrical impulse when the said sensor passes through the footprint area formed by the contact of the tyre with the ground during rolling. The system described in this patent also comprises means for finding the ratio of the said electrical impulse to the duration of one revolution of the tyre and means for transmitting the said ratio to a processing unit within the vehicle.

In particular, the sensor is placed within the tread of the tyre in such a way that the said electrical impulse has a first peak at the entry of the sensor into the footprint area and a second peak at the exit from the footprint area.

According to the teaching of this patent, the ratio between the time elapsed between the two peaks and the period of a complete revolution makes it possible to know the flattening of the tyre during the travel of the vehicle.

This is because the sensor determines the instant of entry into the footprint area and the instant of exit from said area. It is thus possible to measure the length of this area, if the angular velocity of the tyre and its radius are known. The length of the footprint area is then related to the flattening of the tyre, which is a critical parameter of the tyre in operation, particularly in tyres for heavy motor transport.

Patent application EP 689950 describes a different method for determining parameters of a tyre such as its pressure and temperature. In particular, a self-powered programmable electronic device positioned on the inner surface of a tyre or on its mounting rim is used. This device can be used to determine and store the pressure, temperature and the number of rotations of the tyre, and may comprise an extensometer whose output signal measures the bending of the inner surface of the tread, or an accelerometer which measures the value of the acceleration which the tread undergoes. Additionally, the device is activated by an external radio-frequency signal and transmits an alarm signal if a predetermined limit of the measured values is exceeded.

There are also known methods for measuring deformations of the tread of a tyre during motion and for transmitting it to a receiver located on the vehicle.

Patent application WO 9325400 describes a sensor, comprising a resonant circuit which oscillates at a predetermined characteristic frequency, is located within the tread of a tyre, and is capable of transmitting a signal directly dependent on the aforesaid deformations. This resonant frequency is affected by the deformations of the tread during motion and the sensor transmits electromagnetic waves proportional to these variations of the resonant frequency. These electromagnetic waves are received by a processing unit connected to a receiver located inside the vehicle.

U.S. Pat. No. 5,247,831 describes a method for monitoring the behaviour of the footprint area of a tyre during the travel of the vehicle, in order to optimize the driving of the vehicle. In particular, a piezoelectric sensor consisting of longitudinal strips of piezoresistive rubber is inserted into the tread. This sensor is capable of measuring the deformations of the tread, since the strips change their electrical resistance as a function of the said deformations.

There are also known methods and devices for acting on the driving and/or control system of the vehicle, particularly on the devices which control the suspension of the vehicle, to control its behaviour according to the information obtained from the axles of the vehicle or from the wheel hubs.

The publication "A method for the evaluation of the lateral stability of vehicles and tyres" by the Societa Pneumatici Pirelli S.p.A., presented at the International Automobile Tire Conference, Toronto, Canada, on Oct. 22, 1974, illustrated a method for determining the dynamic behaviour of the vehicle as a function of the forces developed by the various types of tyre sets and the various conditions of the road surface.

The publication principally cites three forces which determine the dynamic behaviour of a tyre, namely the vertical force, the longitudinal force and the lateral force.

The vertical force is that which is due to the dynamic load to which the tyre is subjected. The longitudinal force is that which is due to the moment applied to the axis of the tyre as a result of an acceleration or braking of the vehicle. The lateral force, also present in conditions of normal travel in rectilinear motion, is the resultant of the force due to the characteristic angles of the vehicle suspension (camber and toe-in) and to the ply-steer developed by the layers of inclined cords of the belt structure of the tyre, and of the thrust generated by the centrifugal force during drifting. The sum of the forces developed by the four tyres generates a resultant system applied to the centre of gravity of the vehicle, which balances the inertial forces and determines the attitude of the vehicle as a function of the characteristics of the suspension system of each axle. This resultant system is determined by means of suitable accelerometers, one positioned on the front axle and one on the rear axle of the vehicle. The article shows a set of graphs showing the centripetal acceleration or the centripetal force applied to the centre of gravity of the vehicle as a function of the angle of slip of the corresponding axle. From graphs plotted for different ground conditions and different types of tyres, it is possible to determine the behaviour of the vehicle provided with a predetermined set of tyres and to determine any lateral slipping of either the front or the rear axle in cornering.

The Applicant has observed that the aforesaid known systems of controlling the behaviour of the vehicle are based on systems of forces measured at the hubs of the wheels, and the systems of measuring the deformations of the tyre are based on the determination of the deformations undergone by the tread in the footprint area of the tyre.

The Applicant has observed that the values measured in these systems cannot be related in a biunique way to the conditions of travel of the tyre and, more precisely, to the system of forces developed by the tyre in each condition of travel.

SUMMARY OF THE INVENTION

The present invention is based on the Applicant's perception that the determination of deformations of the tread, particularly in the footprint area of the tyre, does not make it possible to identify the system of forces developed by the tyre or the deformations of the tyre carcass which are associated with it and which represent the behaviour of the tyre. This behaviour is of considerable importance, especially during certain particular events, such as the braking or acceleration of the vehicle, drifting, and variations of load on the tyre.

According to the above, the present invention originated from the Applicant's perception that the determination of the deformations of the tyre carcass, which are related in a biunique way to the system of forces developed by the tyre in operation, makes it possible to determine the behaviour of the tyre in any of its conditions of motion.

It has been found that the measurements of the deformation of the carcass structure of the tyre, at a given inflation pressure, according to a set of three Cartesian axes, in other words the deformation in the vertical direction, the deformation in the transverse direction and the deformation in the longitudinal direction, correspond in a biunique way, or in any case a reproducible way, to the vertical, lateral and longitudinal forces respectively which act on the tyre (or, in other words, to the forces which the tyre exchanges with the ground).

The Applicant has previously described this technical solution and the determinations associated with it in patent application 99EP-114962.6, to which reference should be made for further and more detailed information, and which is to be understood as being integrally incorporated in this description.

The Applicant has previously described a particular method and a particular type of device for making the aforesaid determinations in patent application 99EP-125692.6. In this patent application, these deformations are determined by means of a sensor which measures the distance between the sensor itself and certain predetermined points on the inner surface of the tyre liner. The size of the deformations of the carcassstructure of the tyre can be deduced from these distances by means of a calculation.

The present invention relates more specifically to a further method and a further type of device for carrying out the aforesaid determinations.

In particular, the Applicant has discovered a method for determining the deformations of a tyre in motion, which consists in measuring these characteristic values within the tyre by means of a single sensor which illuminates the inner surface of the tyre liner. Areas of high light reflection and areas of low light reflection are formed adjacent to each other on the inner surface of the liner. From the points of discontinuity formed between an area of high light reflection and an area of low light reflection, this sensor determines the deformation of the tyre in the lateral direction, in the longitudinal direction and in the vertical direction. The determination is preferably carried out when the areas of the inner surface which have this alternation of illuminated areas and dark areas are within the footprint area of the tyre.

In a first aspect, the present invention relates to a system for monitoring the deformations of a moving tyre fitted on a rim associated with a vehicle, characterized in that it comprises:

a moving station located in a predetermined position on the said rim and capable of sending an optical beam towards the inner surface of the tyre, receiving the light reflected from the said surface and emitting a signal proportional to the deformations of the tyre in a longitudinal direction, in a transverse direction, and in a vertical direction, a reflecting element positioned on the said inner surface of the tyre, comprising a region which has at least one area of high light reflection and one area of low light reflection, and which is capable of reflecting the said optical beam.

The said system also comprises a fixed station positioned on the said vehicle and capable of receiving the said signal from the said moving station.

Preferably, the said area of high light reflection is produced by colouring the inner surface of the tyre with a reflective paint.

In particular, the said region comprises a plurality of triangles adjacent to each other.

Preferably, the said fixed station is capable of enabling the said measurement carried out by the said moving station.

In particular, the said moving station comprises at least one sensor and an electronic circuit board with which are associated an optical beam emitting device, a first lens, an optical beam receiving device and a second lens.

In particular, the said fixed station comprises a supporting element, fixed at one of its ends to a hub on which the said rim is mounted, and an electronic circuit board fixed to the said supporting element.

In particular, the said electronic circuit board of the fixed station comprises an oscillator circuit which supplies a drive circuit for a first antenna, a radio-frequency receiver connected to the said first antenna, and an electrical demodulator device connected to the said radio-frequency receiver.

Preferably, the fixed station is powered by the battery of the vehicle on which the tyre is fitted.

In particular, the said electronic circuit board of the sensor comprises a second antenna, connected to a power supply unit, which supplies a drive circuit for the said optical beam emitter and a drive circuit for the said optical beam receiver, and a circuit for reading the electrical signal emitted by the said optical beam receiver.

Preferably, the said optical beam emitter comprises an LED or a laser diode.

Preferably, the said optical beam receiver comprises at least one CCD element or a CMOS element.

In a second aspect, the present invention relates to a method for monitoring the deformations of a moving tyre fitted on a rim associated with a vehicle, characterized in that it comprises the following steps:

emitting a signal within the tyre from a predetermined position on the said rim, reflecting this signal from the inner surface of the tyre, receiving this reflected signal, processing the received signal in such a way as to generate a signal proportional to the deformations of the tyre in a longitudinal direction, in a transverse direction and in a vertical direction.

In particular, the said step of emitting a signal comprises:

enabling a moving station located on the said rim to emit the said signal when the said moving station passes through the footprint area of the tyre.

Additionally, the said method also comprises the step of transferring the said signal processed by the said moving station to a fixed station located on the said vehicle.

Preferably, the said step of enabling a moving station is carried out by the said fixed station.

In particular, the said step of enabling the moving station comprises supplying power to the moving station for a time interval during which the step of transferring the processed signal from the said moving station to the said fixed station is also carried out.

In particular, the said step of enabling a moving station comprises generating a magnetic field at the said fixed station in the direction of the said moving station and of supplying power by means of the said magnetic field to a drive circuit for an optical beam emitter.

In particular, the said step of transferring the said processed signal from the said moving station to the said fixed station comprises:

generating a magnetic field corresponding to the said processed signal at the said moving station in the direction of the said fixed station, converting the said magnetic field to an electrical signal, decoding the said electrical signal in such a way that the corresponding processed signal is obtained.

In a further aspect, the present invention relates to a wheel for vehicles, comprising a tyre fitted on a supporting rim, characterized in that it comprises a moving station, located at a predetermined position on the said rim, capable of sending an optical beam towards the inner surface of the tyre, receiving the light reflected from the said surface and emitting a signal proportional to the deformations of the tyre in a longitudinal direction, in a transverse direction and in a vertical direction to a vehicle on which the said wheel is fitted, a reflecting element positioned on the said inner surface of the tyre, comprising a region which has at least one area of high light reflection and one area of low light reflection, and which is capable of reflecting the said optical beam.

BRIEF DESCRIPTION OF THE DRAWINGS

Further characteristics and advantages of the present invention are explained in greater detail in the following description, with reference to the attached drawings, which are provided solely for explanatory purposes and without any restrictive intent, and which show.

DETAILED DESCRIPTION OF THE PREFERRED EMBODIMENTS

Figure 1:
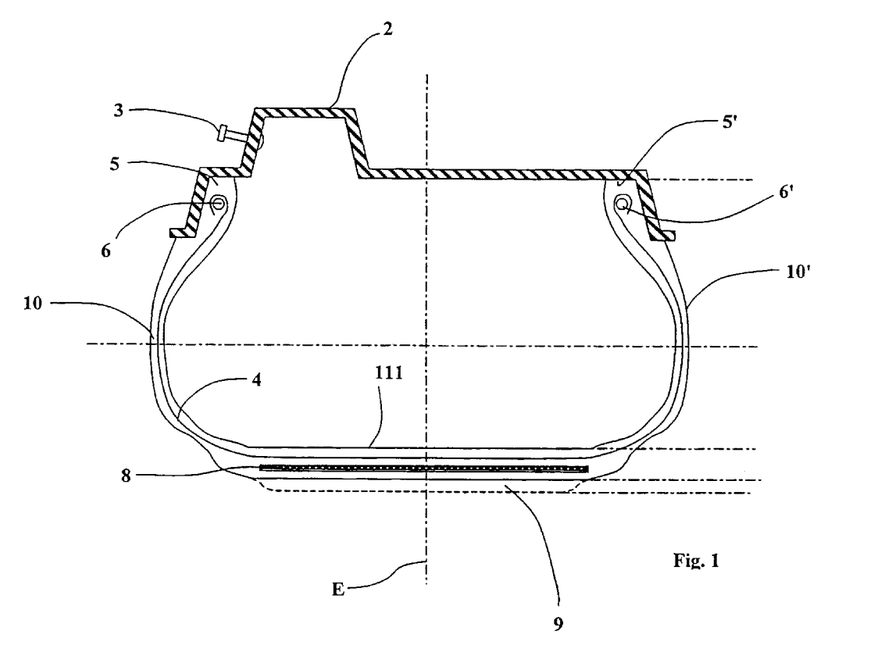
in FIG. 1, a cross section through a tyre fitted on its supporting rim under a static load.

FIG. 1 shows, by way of example, a wheel comprising a tyre 1, of the type conventionally called "tubeless", in other words without an inner tube, and a supporting rim 2. This tyre 1 is inflated by means of an inflation valve 3 located, for example, in a known way, on the channel of the said rim.

The tyre 1 consists of an internally hollow toroidal structure formed by a plurality of components, and primarily by a textile or metallic carcass, having two beads 5 and 5' each formed along an inner circumferential edge of the carcass for securing the tyre to the corresponding supporting rim 2. The said carcass comprises at least one pair of annular reinforcing cores, called bead wires 6 and 6', which are circumferentially inextensible and are inserted in the said beads (usually with at least one bead wire per bead).

The carcass comprises a supporting structure formed by a reinforcing ply 4 which includes textile or metallic cords, extending axially from one bead to the other according to a toroidal profile, and which has each of its ends associated with a corresponding bead wire.

In tyres of the type known as "radial", the aforesaid cords lie essentially in planes containing the axis of rotation of the tyre.

On the crown of this carcass there is placed an annular structure 8, known as the belt structure, normally consisting of one or more strips of rubberized fabric, wound on top of each other to form what is called a "belt package", and a tread 9 made from elastomeric material, wound around the belt package, and stamped with a relief pattern for the rolling contact of the tyre with the road. Two sidewalls 10 and 10', made from elastomeric material, each extending outwards in the radial direction from the outer edge of the corresponding bead, are also placed on the carcass, in lateral axially opposed positions.

In tyres of the type known as "tubeless", the inner surface of the carcass is normally covered with what is called a "liner" 111, in other words one or more layers of airtight elastomeric material. Finally, the carcass may comprise other known elements, such as edges, strips and fillers, according to the specific design of the tyre.

The combination of all these elements determines the mechanical characteristics of elasticity, rigidity and resistance to deformation of the tyre, which constitute the connection between the system of forces applied to the tyre and the extent of the corresponding deformations which it undergoes.

Figure 2:
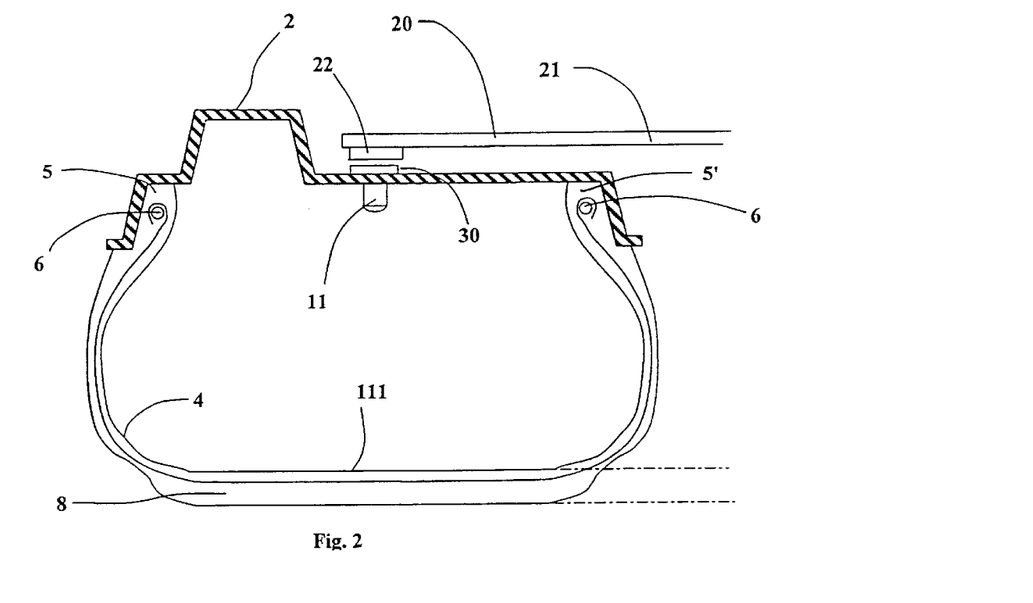
in FIG. 2, a detail of a tyre showing the system for determining the deformations of the tyre according to the present invention, comprising a moving station and a fixed station.

FIG. 2 shows, in a preferred embodiment of the invention, a system for monitoring the profile of the tyre of FIG. 1, fitted on the supporting rim 2 and associated with a vehicle; the system comprises a moving station 30, fitted in the wall of the supporting rim 2 and including a sensor/emitter 11 (called a "sensor" below for the sake of brevity), located within the cavity formed between the tyre and the rim, preferably along the mid-line plane of the said rim.

This moving station 30 comprises a transmitter which sends the determinations made to a fixed station 20, located on the said vehicle and provided with a suitable receiver.

The fixed station is preferably associated with the corresponding hub of the vehicle by means of suitable supports which are described below.

The moving station and the fixed station communicate with each other in any convenient way, for example by magnetic coupling between the two stations or by means of radio waves, preferably at high frequency.

Figure 3:
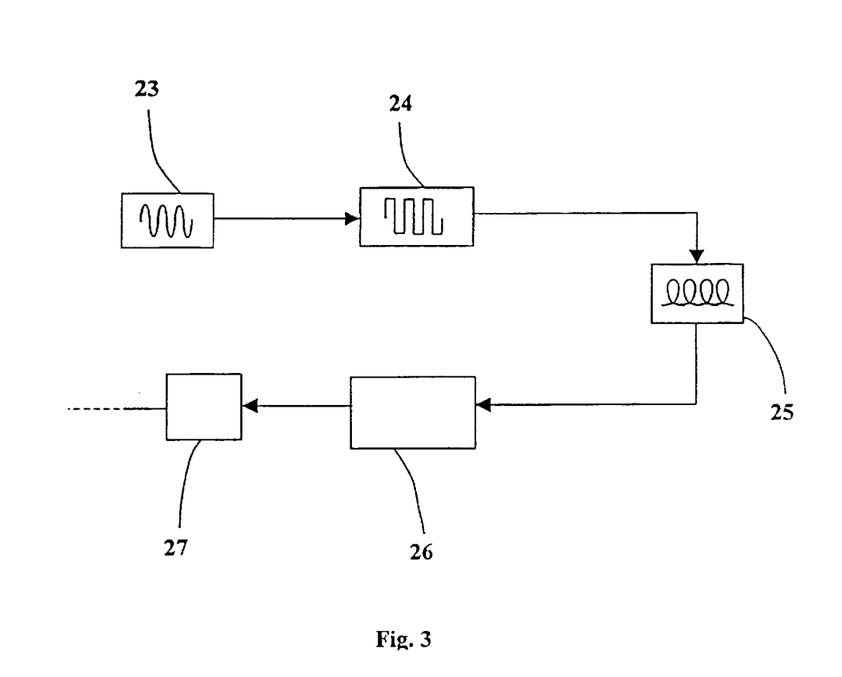
in FIG. 3, a block diagram of the electronic circuit present within the fixed station shown in FIG. 2.

In a preferred embodiment, the fixed station 20 comprises a supporting element 21, fixed at one of its ends to the hub of a wheel, and an electronic circuit board 22, placed preferably at the opposite end of the said supporting element, a block diagram of this circuit board being provided in FIG. 3.

In particular, the said electronic circuit board comprises an oscillator circuit 23, which supplies a drive circuit 24 for a first antenna 25, referred to below as the fixed antenna. The said circuit board also comprises a radio-frequency receiver 26 connected to the said antenna and an electrical demodulator device 27. The electrical power required to supply the said station can be provided directly by the vehicle battery through a suitable drive circuit (not shown).

Figure 4:
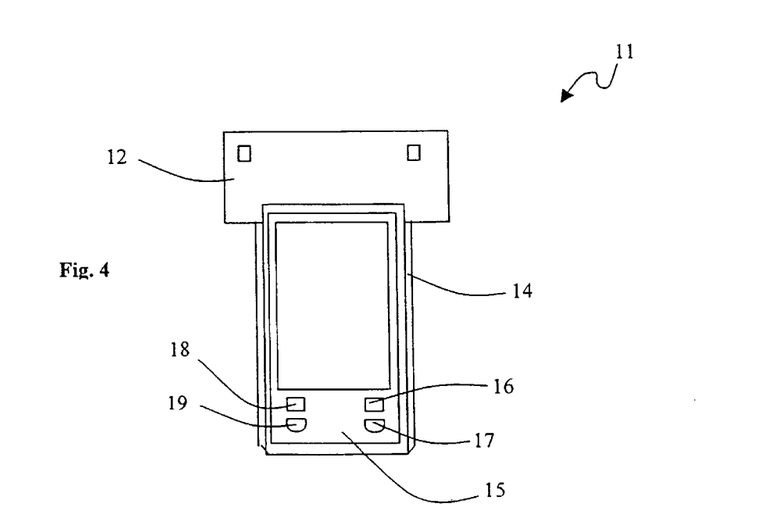
in FIG. 4, the moving station in detail, showing its electrical and optical component parts.

In a preferred embodiment, the moving station 30 shown in FIG. 4 essentially consists of the sensor 11, comprising a hollow support 12, preferably made from plastic material, into which an externally threaded tube 13 is inserted, preferably by screwing. The external thread 14 of the tube 13 is used both for inserting the tube into the support and for fixing the whole station within the wall of the supporting rim 2 of the wheel. Alternatively, the wall of the support can be threaded both externally, for fixing the station into the wall of the rim, and internally, for enabling the tube 13 to be fitted. The main function of the support 12 is to form an airtight plug for sealing the hole formed in the body of the rim 2.

An electronic circuit board 15, with which are associated an optical beam emitting device 16, a first lens 17, an optical beam receiving device 18, and a second lens 19, is inserted into the tube 13.

Figure 5:
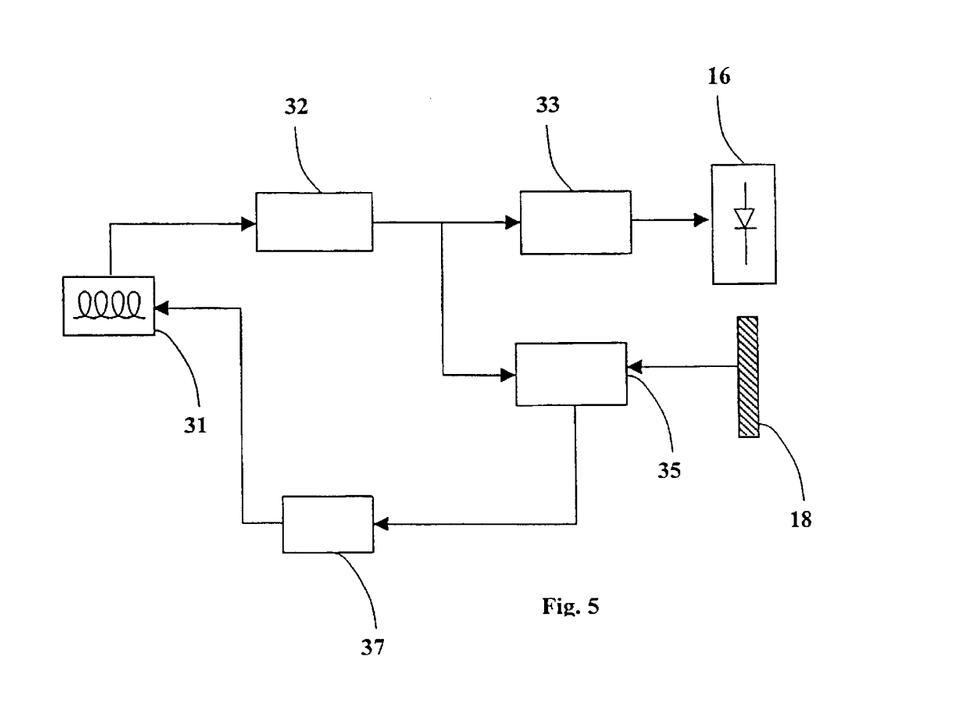
in FIG. 5, a block diagram of the electronic circuit present within the moving station shown in FIG. 4.

The electronic circuit board 15, the block diagram of which is shown in FIG. 5, also comprises a second antenna 31, called the "moving antenna" below, connected to a power supply unit 32, which supplies the electrical power to the optical beam emitting device 16 and to the optical beam receiving device 18. For this purpose, the moving station comprises a drive circuit 33 for the said emitter 16 and a drive circuit 35 for the said receiver 18. This electronic circuit board also comprises a circuit 37 for reading the signal received by the said receiver 18, the output of this circuit being connected to the said moving antenna 31.

Preferably, the optical beam emitting device 16 is an LED 34 which emits an optical beam of infrared light.

Preferably, the optical beam receiving device 18 is formed by a linear CCD (charge coupled device) element comprising a plurality of photodiodes adjacent to each other. Alternatively, this receiver can be a CMOS (complementary metal oxide semiconductor) element or other linear semiconductor sensor.

In the preferred example of an embodiment described above, the communication between the said moving station and the said fixed station is provided by means of magnetic coupling: in other words, each of the fixed antenna 25 and the moving antenna 31 preferably comprises an inductive circuit, and the signal exchanged between the two antennae is a magnetic signal. In particular, with reference to FIG. 6, the fixed antenna 25 comprises a fixed coil 251, supplied with an alternating radio-frequency current generated by the drive circuit 24, and the moving antenna 31 comprises a moving coil 311 which is integral with the rim 2 of the wheel.

Figure 6:
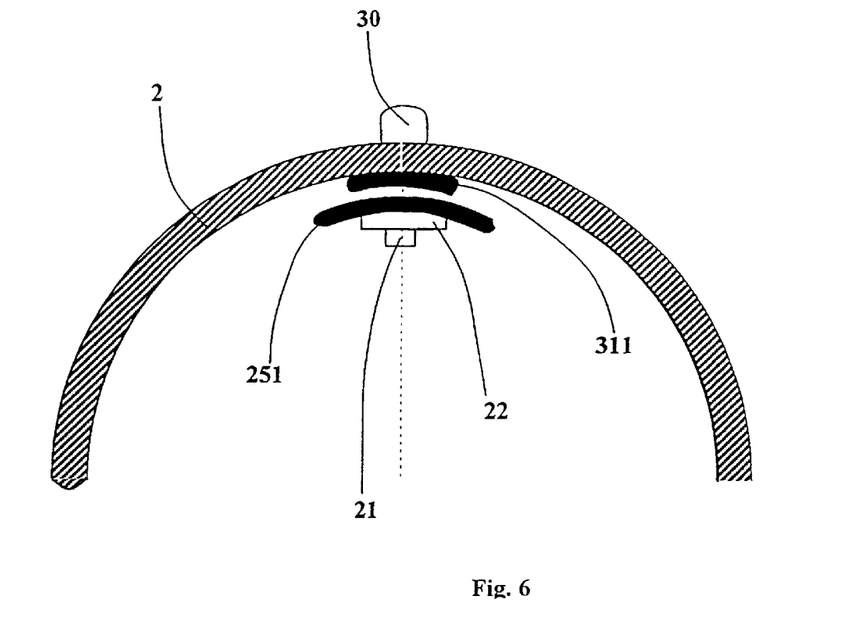
in FIG. 6, a detail of the wheel according to the present invention, showing in particular the area of coupling between the antenna located on the fixed station and the antenna located in the moving station.

With each rotation of the pneumatic wheel, the moving coil 311 is brought to a position facing the fixed coil 251, thus intercepting the magnetic field generated by the aforesaid coil. A corresponding electrical voltage is induced in the moving coil 311 and supplies the energy required for the operation of the moving station as a whole.

In an original way, according to the invention, the moving station carries out at least one of the specified determination in the tyre within the time interval during which the moving coil and the fixed coil are facing each other, and sends, by means of the moving coil, a signal corresponding to the measurement which has been made. A voltage corresponding to the measurement made is induced in the fixed coil, as will be explained in greater detail below.

More precisely, the pair of antennae produce the transfer, between the fixed station and the moving station, of the electrical power required to supply the moving station, and also the transfer, between the fixed station and the moving station, of the data on the measurements made in the tyre. In particular, the information is transmitted in the form of a signal modulating the alternating power supply voltage of the fixed coil.

Figure 7A:
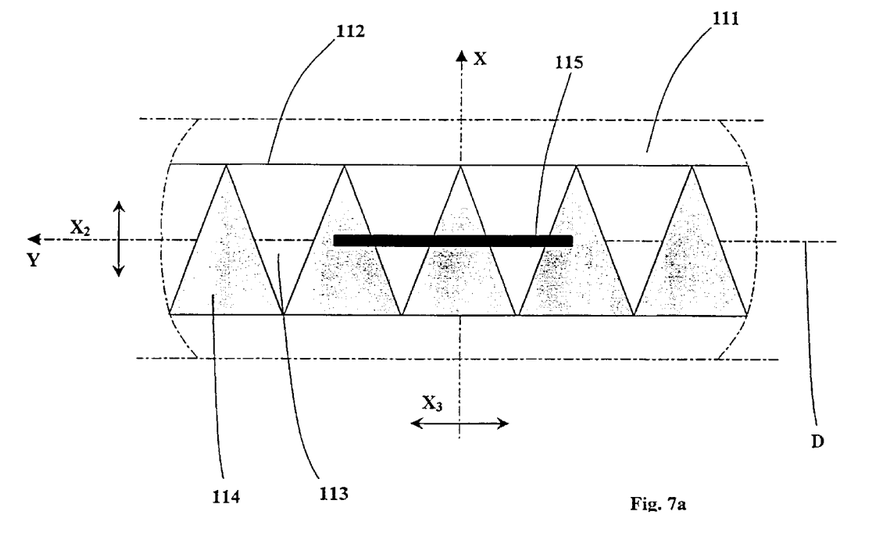
in FIG. 7a, the inner surface of the liner of a tyre, viewed in the footprint area of the tyre, showing a reflecting element.

The inner surface of the liner 111 has a reflecting element, shown in particular in FIG. 7a, comprising a region 112, preferably of rectangular shape and having a length, in the longitudinal direction of advance of the tyre, essentially equal to the length of the footprint area of the tyre.

The region 112 comprises areas of high reflectivity 113 alternating with areas of low reflectivity 114. For the purposes of the present invention, an area of high reflectivity preferably reflects at least 100% more of the light sent from the LED than the area of low reflectivity. These areas are triangular in the described embodiment; alternatively, these areas can be trapezoidal. More generally, these areas can have any shape, provided that, on the plane of the liner surface, they form an alternation of areas of high reflectivity and areas of low reflectivity, both in the longitudinal direction of advance of the tyre and in the direction orthogonal to it.

The aforesaid region is located within the surface of the liner, preferably in a central position, and in particular is centered with respect to an axis D which represents the intersection of the equatorial plane of the tyre with the surface of the footprint area.

The alternation of areas of high reflectivity with areas of low reflectivity can be obtained by colouring the areas of high reflectivity with, for example, reflective paints, and leaving the areas of low reflectivity unchanged, thus maintaining in the latter the original dark colour of the mixture from which the liner layer is made.

A method for moulding symbols on rubber articles, particularly tyres, in which the symbols are applied in a colour suitable for the purpose of forming these areas of high reflectivity, is described in patent application 97WO-EP05196 in the name of the present Applicant.

Clearly, many other equivalent systems can also be used for the transfer of the information.

In the embodiment described above, as has been said, the sensor comprises both the signal emitting element and the element receiving the reflected signal. It should be understood that the two functions can be carried out by two independent elements which are separate from each other, or by a single element which combines them both, according to the specific technology used.

The monitoring system described above by way of example operates in the following way.

Within the fixed station 20, the coil 251 is supplied continuously with an electrical current which is generated by the oscillator 23 and made sinusoidal by the drive circuit 24, in such a way as to generate a magnetic field.

The moving coil 311 located in the moving station 30 intercepts this magnetic field whenever the coil, during the rotation of the wheel, passes the position of the fixed coil. The interception of the magnetic field induces a current in the moving coil. This current has the same sinusoidal form as the power supply current of the fixed coil and is sent to the power supply device 32. This device preferably comprises, in a known way, a bridge of diodes or equivalent devices capable of converting a sinusoidal current to a continuous current. The current produced in this way supplies the optical beam emitting device and the optical beam receiving device. In particular, this current supplies the drive device 33 of the LED and the drive device 35 of the CCD element.

Figure 7B:
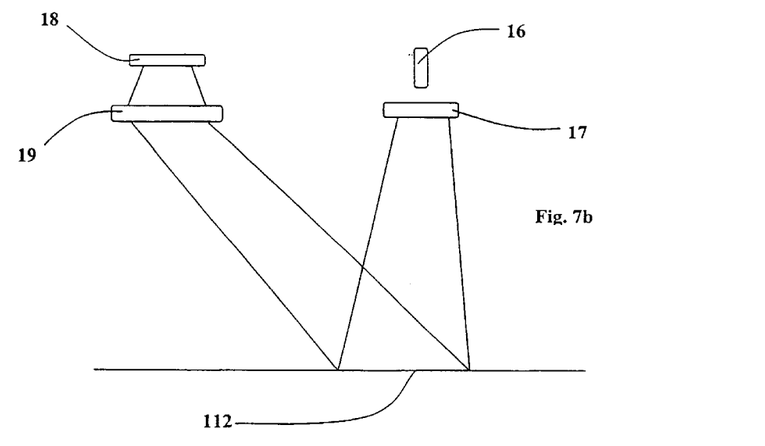
in FIG. 7b, a schematic representation of an optical beam sent by an optical beam emitter to the inner surface of the liner of a tyre, and reflected by the latter towards an optical beam receiver.
Figure 7C:
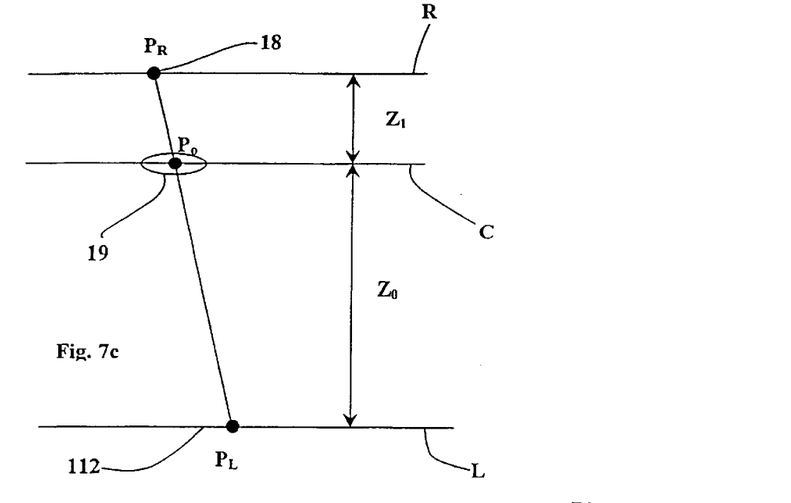
in FIG. 7c, a schematic representation of an optical beam reflected from the inner surface of the liner of a tyre towards an optical beam receiver, in relation to a system of Cartesian axes.

With reference to the diagrams in FIGS. 7a, 7b and 7c, the optical beam emitting device (LED) emits an optical beam collimated by the first lens 17, directed towards a predetermined point of the surface of the liner, preferably within the footprint area of the tyre. The rays reflected from the region 112 of the tyre liner reach the optical beam receiver 18 by passing through the second collimating lens 19, which enables the CCD to receive the rays reflected from the region 112. FIG. 7a shows a rectangle 115 which corresponds to the area which the CCD monitors via the lens 19.

The device 37 for reading the electrical signal generated by the CCD element sends a corresponding electrical signal via the antenna 31 to the fixed station. This signal transmission takes place because the signal corresponding to the aforesaid difference in practice amplitude modulates the sinusoidal current induced in the moving coil. This amplitude modulation creates a change in the magnetic field which is detected by the fixed coil by means of the radio-frequency receiver 26. A signal corresponding to the aforesaid amplitude modulation is extracted from this coil by the demodulator 27, and is sent to the vehicle for the specified uses.

Now that the system of monitoring is known in a preferred embodiment of its more general aspect, the method according to the invention for recognizing the behaviour of a tyre in operation will be more clearly apparent.

Figure 8:
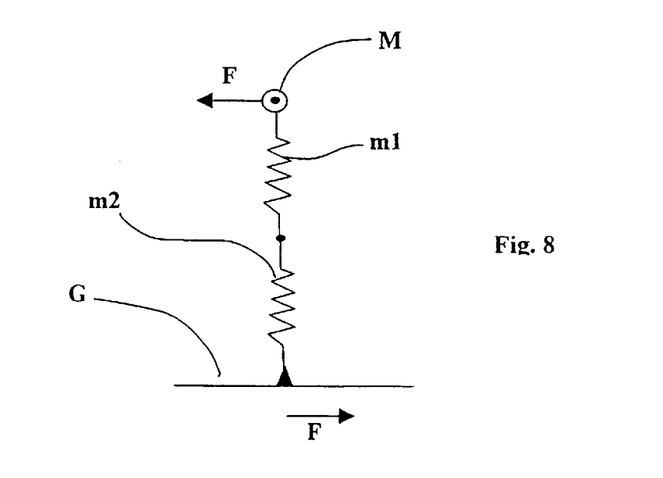
in FIG. 8, a schematic representation of a pneumatic wheel.

FIG. 8 is a schematic representation of the structure of a pneumatic wheel with two springs m1 and m2 mounted in series between the hub M of the vehicle and the surface G of the ground.

The spring m1 represents the carcass structure of the tyre, while the spring m2 represents the structure of the tread, which has a specific elasticity dependent on the visco-elastic characteristics of the mixture and on the geometrical characteristics of the tread design.

The force F applied to the footprint area of the tyre is balanced by an equal and opposite force F applied to the hub of the wheel. Unless the behaviour of m1 (m2) is known, it is not possible to know the value of the deformation caused by the force acting on m1 (m2), and vice versa.

The forces transmitted by the tyre to the ground in a given situation, static or dynamic, are associated with the deformations of the tyre, in other words with the deviations of the profile of the carcass in operation from the simple inflation profile of the carcass.

The profile of the carcass in operation is also defined here by the term "deformed state of the carcass", while the simple inflation profile of the carcass, in other words that of the carcass in the tyre fitted on the rim on which it is used and inflated to its nominal operating pressure, in the absence of a load, is defined here, although not strictly accurately, as the equilibrium profile.

For the purposes of the present invention, the carcass profile is defined as the profile according to the neutral axis of the carcass plies in the cross section of the tyre. In particular, the carcass profile describes the deformed state of the said tyre under the effect of the system of forces acting on it.

It is not possible to deduce the deformed state of the carcass in a unique way from determinations carried out on the footprint area. Similarly, it is not possible to find the deformation of the footprint area in a unique way from the deformed state of the carcass, since the deformation depends on parameters which are frequently unknown, particularly the value of the coefficient of friction between the tyre and the ground:

The Applicant has perceived that the deformed carcass profile, at a given inflation pressure, itself yields a description of the actual behaviour of the tyre in motion. Other significant parameters for the interpretation of the measurements of the deformations of the tyre are the value of the inflation pressure of the tyre, the temperature of the fluid within the tyre, and its velocity or acceleration.

The deformations of the carcass profile considered for the purposes of the present invention are defined as follows:

flattening ($X_1$): the deformation directed along a vertical axis or in any case along an axis perpendicular to the road surface;

lateral displacement, or skidding, or drift ($X_2$): the deformation directed along the axis of rotation of the tyre;

longitudinal creep or torsion ($X_3$): the deformation directed along the circumferential direction, in other words the direction of rolling of the tyre.

A more detailed description of the relations present between the said values and the behaviour of a tyre is given in the aforesaid patent application 99EP-114962.6 in the name of the present Applicant.

The measurement of these deformations is expressed as a variation of $X_1$, $X_2$, $X_3$ with respect to corresponding values determined on the equilibrium profile of the tyre at a specific inflation pressure.

Figure 9:
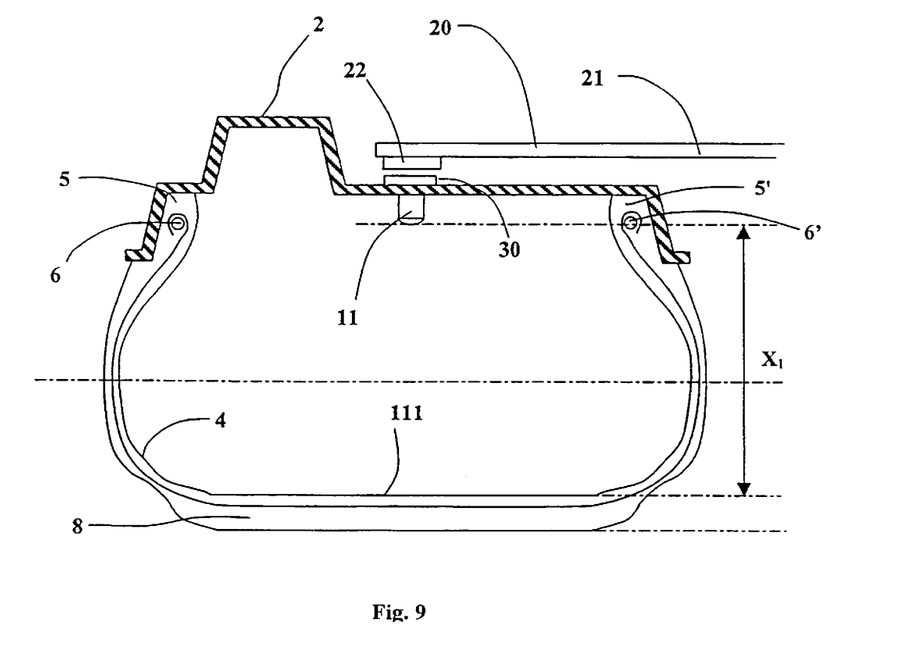
in FIG. 9, a cross section through a tyre fitted on its supporting rim, showing a system according to the invention for monitoring the deformation in the vertical direction (in other words, in the direction of flattening)
Figure 10:
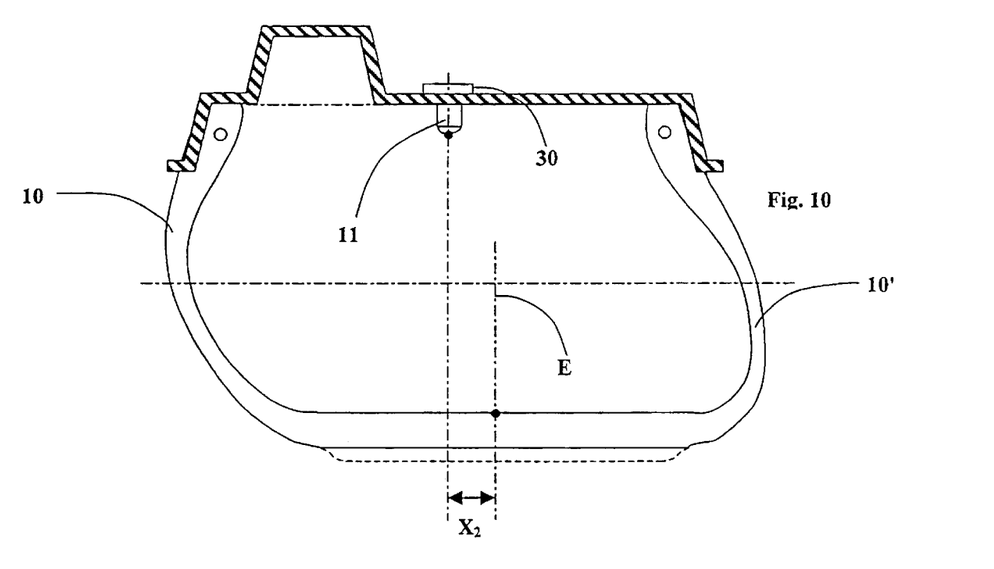
in FIG. 10, a longitudinal section through a tyre fitted on its supporting rim in conditions of lateral drift, showing a system according to the invention for monitoring the deformation in the lateral direction (in other words, in the direction of lateral displacement)
Figure 11:
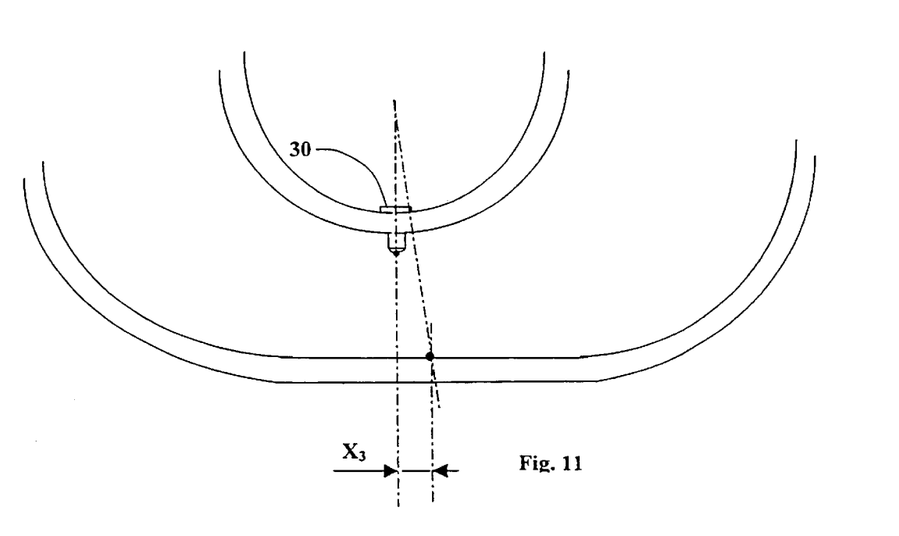
in FIG. 11, a longitudinal section through a tyre fitted on its supporting rim in conditions of braking, showing a system according to the invention for monitoring the deformations in the longitudinal direction (in other words, in the direction of longitudinal displacement).

The inner surface of the tyre, particularly the component called the "liner", interacts with the sensor 11 in the determination of $X_1$, $X_2$, and $X_3$ as shown in FIGS. 9, 10, and 11.

In FIG. 9, the distance $X_1$ corresponds to the distance between the surface of the liner 111 and the sensor 11 in the direction of the radius of rolling of the tyre.

In FIG. 10, the distance $X_2$ corresponds to the displacement in the transverse direction of the point of projection of the sensor 11 on the surface of the liner 111 with respect to the point of intersection of the surface of the liner with the equatorial plane E.

In FIG. 11, the distance $X_3$ corresponds to the displacement in the circumferential direction of the point of projection of the sensor 11 on the surface of the liner 111, along the equatorial plane, with respect to the point of the surface of the liner in the centre of the footprint area.

Advantageously, the reflected signals can be encoded in the sensor itself. For example, the sensor can emit two optical beams, each directed towards a predetermined point on the surface of the liner.

EXAMPLE OF MEASUREMENT

Purely by way of example, and with reference to FIGS. 7a, 7b, 7c and 7d, a description will now be given of the method of determining the aforesaid values in a tyre produced by the present Applicant, which is of grade 195/65R15 and speed class V, in other words up to 240 km/hr, and is inflated to a pressure of 2.2 bars.

The power supply to the fixed station is provided by the vehicle battery, particularly at a voltage of 12 volts, and the frequency of the power supply signal to the fixed coil is chosen to be approximately 1 MHz.

The maximum rotation speed of the tyre can be 2500 r.p.m. and the measurement is to be made at this speed. A fixed coil of elliptical shape, having a major axis of approximately 10 cm, and a moving coil of elliptical shape, having a major axis of approximately 2 cm, are selected; the arc along which the two coils face each other fully is approximately 10 cm, and the air gap between the two coils is approximately 3 cm. At a speed of 2500 r.p.m., the useful measurement range, in other words that in which the moving coil is acted on fully by the magnetic field generated by the fixed coil, is approximately 720 ms.

The power supply circuit 32 of the moving station 30 is designed in such a way as to have a charging time of not more than 100 ms. In the following 300 ms the LED is correctly supplied and emits the optical beam, and at the same time the optical beam emitted by the LED is received and the reading circuit 37 reads the measurement.

The quantity of light reflected from the tyre is approximately 10% of the quantity of light emitted by the LED. Additionally, the quantity of light received by the CCD element as a whole is approximately 10% of the quantity of light reflected from the tyre. The emission power of the LED is approximately 15 mW, and therefore the total optical power received by the CCD element is approximately 1.5 mW. Each of the photodiodes of the CCD element therefore receives 1.5/n mW, where n is the total number of photodiodes.

The sensitivity of the photodiodes used is approximately 0.5 A/W, and therefore the current generated by them is approximately 0.75/n mA, where n is the number of photodiodes contained in the CCD.

In the last 300 ms which can be used for the measurement, the signal emitted by the reading circuit is retransmitted to the fixed station by means of the antenna and separated from the carrier by means of the demodulator 27.

FIG. 7c shows a plane L of the surface of the liner, a horizontal plane C passing through the centre of the lens 19, and a horizontal plane R passing through the receiving surface of the CCD.

The origin of the Cartesian axes x, y, z is the point $P_0$ (0,0,0), the x axis represents the transverse direction, the y axis represents the longitudinal direction, and the z axis represents the vertical direction. The reflection point $P_L$ in the region 112 has coordinates (x, y, $z_0$), where $z_0$ is the distance of the liner surface from the lens 19 in the vertical direction. The reading point $P_r$ on the plane of the COD, corresponding to the reflection point $P_L$, has the coordinates $$\left(-x\frac{z_1}{z_0}, -y\frac{z_1}{z_0}, z_1\right).$$

Let us assume that, on the liner surface, also called the "image plane", the region 112 is at an unknown distance $x_1$, and has undergone a lateral displacement of $x_2$ and a longitudinal creep of $x_3$. The values of $x_1$, $x_2$ and $x_3$ must be found by reading from the CCD element.

The CCD element is positioned in the longitudinal direction y, and therefore the reading of the reflected optical beams is reduced to a reading of at least three points located along the said y axis. FIG. 7a identifies an essentially rectangular reading area 115 of the CCD element. Because of the small dimensions of the CCD with respect to the pattern formed on the liner surface, this rectangular shape can be approximated to a segment.

Figure 7D:
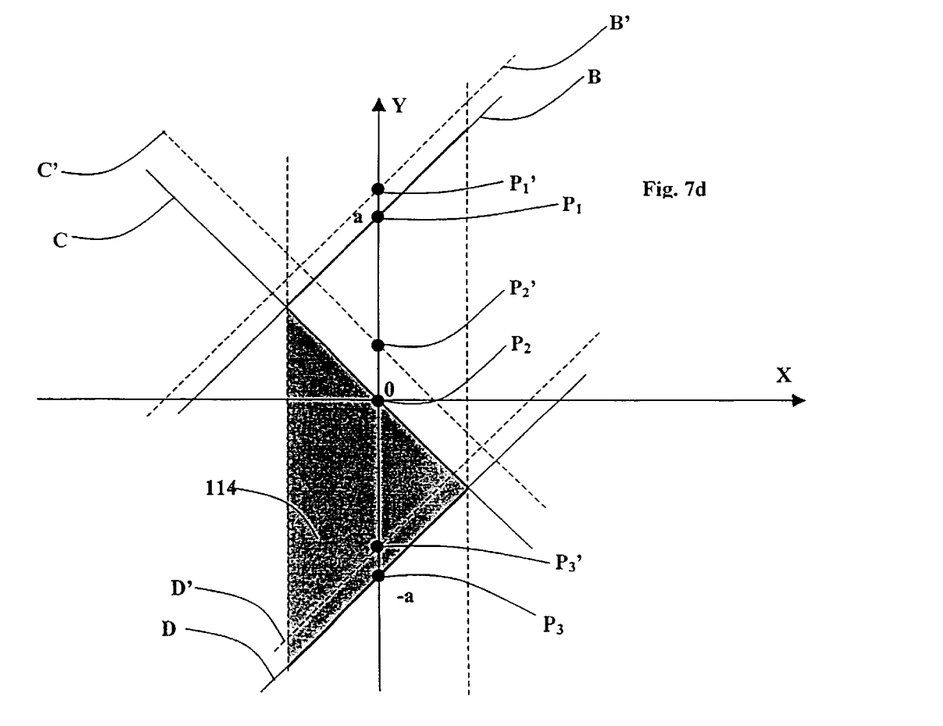
in FIG. 7d, a portion of the inner surface of the liner of a tyre, viewed in the footprint area of the tyre, showing the movement of a reflecting element.

With reference to FIG. 7d, the sides of the triangle 114 shown in FIG. 7a are identified by the letters B C D and are described by the equations of three straight lines lying in the plane of the liner surface, $z=z_0$.

The equations of these straight lines are, respectively,

*B:* $y=x+a;$

*C:* $y=-x;$

*D:* $y=x-a.$

The parameter a is known, since the shape of the triangles, in other words the slope and positions of the straight lines forming the triangles with respect to the origin of the system of Cartesian axes, has been established a priori. In particular, the system of Cartesian axes has its point of origin $P_0$(0,0,0) in the centre of the lens 19 for collimating the rays reflected from the region comprising the triangles towards the CCD. By way of example, straight lines with angular coefficients of unity have been chosen in order to simplify the calculation. Within the scope of the present invention, it is possible to provide triangles having different shapes, or those formed by straight lines having angular coefficients different from one.

In FIG. 7d, the image which the CCD element detects is positioned along the y axis. In particular, the coordinates of the three points $P_1$, $P_2$ and $P_3$ are, respectively, $P_1$ (0, a, $z_0$);

$P_2$ (0, 0, $z_0$);

$P_3$ (0, -a, $z_0$)

Let us assume that the tyre is subjected to a lateral displacement $X_2$ and a longitudinal creep $X_3$ and a load or flattening $X_1$ which was previously also denoted by $z_0$. The triangles are displaced by these amounts, and therefore the equations of the three straight lines which represent the sides of the triangles, identified in the figure as B', C' and D', become:

$B'$: $(y+x_3)=(x+x_2)+a;$ $C'$: $(y+x_3)=-(x+x_2);$ $D'$: $(y+x_3)=(x+x_2)-a;$

By intersecting the said straight lines with the y axis (equation x=0) it is possible to find the coordinates of the points $P_1'$, $P_2'$ and $P_3'$ which represent the displacement of the points $P_1$, $P_2$ and $P_3$ resulting from the creep and displacement of the tyre. In particular, $P_1'$ (0, $-x_3+x_2+a$, $x_1$);

$P_2'$ (0, $x_3-x_2$, $x_1$);

$P_3'$ (0, $--x_3+x_2-a$, $x_1$).

From equation (1), these points can be found on the plane of the CCD. In particular, these points have the coordinates (0, $(x_3-x_2-a)z_1/x_1$, $z_1$);

(0, $(x_3+x_2)z_1/x_1$, $z_1$);

(0, $(x_3-x_2+a)z_1/x_1$, $z_1$).

From the reading on the CCD, three values $C_1$, $C_2$ and $C_3$ are found: these represent the discontinuities of reflection which occur at the points $P_1'$, $P_2'$ and $P_3'$ on the image plane.

These three values correspond to the points previously calculated on the plane of the CCD along the y axis. By relating the readings $C_1$, $C_2$ and $C_3$ to the coordinates of the points $P_1'$, $P_2'$ and $P_3'$ on the plane of the CCD along the y axis, we obtain:

$C_1=(x_3-x_2-a)z_1/x_1;$ (2)

$C_2=(x_3+x_2)z_1/x_1;$ (3)

$C_3=(x_3-x_2+a)z_1/x_1.$ (4)

The three relations above form a system of three equations and three unknowns ($x_1$, $x_2$ and $x_3$) from which the values of the flattening $x_1$, the lateral displacement $x_2$ and the longitudinal creep $x_3$ can be found.

Additionally, by carrying out a derivation of $C_2$ with respect to $x_2$, a sensitivity to the displacements in the lateral direction is determined from equation (3) and is equal to $_1i/x_1$.

Additionally, by carrying out a derivation of $C_2$ with respect to $x_3$, a sensitivity to the displacements in the longitudinal direction is determined from equation (3) and is equal to $z_1/x_1$.

By deriving $C_2$ with respect to $x_1$, a sensitivity to the vertical creep is determined from equation (2) and (4) and is equal to:

$a*z_1/x_1.$

The shape and size of the triangles on the surface of the liner is determined by the selection of the parameter a and of the angular coefficient of the three straight lines B, C and D, previously assumed to be equal to one. Assuming that a=1, a sensitivity of $z_1/x_1$ in the transverse and longitudinal directions is found.

A tyre of the type described previously by way of example, when inflated to a pressure of 2.2 bars and fitted on a vehicle, has a vertical measurement distance, in other words the distance when vehicle is stationary, of approximately 60 mm. The sensor described by way of example has a distance of approximately 6 mm between the second lens 19 and the CCD 18. Starting from these premises, the Applicant has observed that, for displacements of the order of one millimeter on the surface of the tyre in the lateral and longitudinal directions, the displacement of the lights points occurring on the surface of the CCD is approximately 0.1 mm. A CCD suitable for the described example must therefore have a sensitivity of the order of a tenth of a millimeter. To use CCDs with lower sensitivities, it is possible to increase the size of the triangles formed on the surface of the liner 111.

Furthermore, the example of measurement described is based on the measurement of three points of discontinuity, in other words of passage from a surface of high reflectivity to one of low reflectivity or from a surface of low reflectivity to one of high reflectivity, which represent the minimum number of points to be detected to obtain the measurement of $X_1$, $X_2$ and $X_3$. To improve the quality of the measurement, it is possible to detect a larger number of points of discontinuity, in order to obtain a number of readings of $X_1$, $X_2$ and $X_3$ which is greater than one. Subsequently, and advantageously within the sensor or alternatively in a processor outside the wheel, it is possible to carry out a subsequent processing of these groups of three readings and find their mean, and calculate the mean square deviation in order to reject any inaccurate readings, for example those affected by a misalignment between the CCD and the triangles formed on the surface of the liner.

Additionally, the measurements made are preferably expressed as variations of longitudinal creep, variations of lateral displacement and variations of load with respect to a measurement made on the base figure, particularly of the region including the aforesaid triangles in static conditions. The readings which are made dynamically for $X_1$, $X_2$ and $X_3$ are compared with this base reading, in such a way as to determine the variation of the forces acting on the tyre.

It should be understood that the sensor and the reflecting element described above can be replaced with equivalent effect, within the scope of the present invention, with other types of sensors and reflecting elements capable of determining the aforesaid parameters by means of the reflection of a signal within the tyre.

Alternatively, it is possible to mount a plurality of sensors on the rim, these sensors being preferably located in positions equidistant from each other, in such a way as to maintain a uniform distribution of the masses in the wheel. Moreover, the number of the sensors may be such as to permit the determination of each characteristic value more than once during a complete rotation of the wheel.

Additionally, the sensor measures $X_1$, $X_2$ and $X_3$ simultaneously and sending, for example, a signal consisting of a first amplitude modulation for $X_1$ in a first time interval, a second amplitude modulation for $X_2$ in a second time interval, and a third amplitude modulation for $X_3$ in a third time interval. The set of three time intervals lies within the time interval used for the measurement.

The system of monitoring the deformed profile of the tyre preferably also comprises a pressure measuring device and/or a velocity and/or acceleration measuring device.

Alternatively, the moving station can be self-powered, using batteries located within it, a suitable timer enabling the measurement of the characteristic distances, preferably at the moment of the passage of the sensor under the footprint area of the tyre.

In a different embodiment, communication between the moving station and the fixed station is provided by means of radio waves, by fitting a suitable transmitter in the moving station and a suitable receiver in the fixed station.

The moving station is advantageously associated with the rim of the tyre, which forms an essential component for the determination of the deformations of the tyre.

Finally, the attention of the person skilled in the art is drawn to the fact that the moving station, in the described embodiment, takes the form of a cylinder with a height of several centimeters. Since this cylinder projects radially from the surface of the rim towards the interior of the wheel cavity, it forms an element which interferes with the beads of the tyre during the step of fitting the said tyre on the rim. In other words, the moving stations do not allow the beads to slide axially along the surface of the rim until they reach the corresponding bead seats and bear on the flanges of the rim.

The moving stations must therefore be removed during the operation of fitting the tyre on the rim: in practice, the step of fitting a tyre on a rim designed to house at least one moving station according to the present invention is carried out in the following steps:

an airtight sealing element is inserted in each hole present on the rim for housing the moving stations, this element generally being a screw plug interchangeable with the said station;

the tyre is fitted on the rim by making the beads of the tyre pass in succession over the same flange of the rim and bringing the said beads to the start of the conical surfaces which axially delimit the inner edges of the bead seats;

air is admitted to the tyre in such a way that each bead is brought on to the corresponding bead seat, and bears on the said flanges located at the axially opposite edges of the rim;

the tyre is deflated and the sealing elements are replaced with the moving stations;

the tyre is inflated to the desired pressure.

The sealing elements are only required to ensure airtightness, to allow the beads to be forced into the corresponding seats, and therefore they do not need to project radially into the cavity of the tyre: thus they allow the beads of the tyre to slide easily over the surface of the rim until they reach the specified fitting position.

What is claimed is:

1. A system for monitoring deformations of a moving tyre fitted on a rim associated with a vehicle, comprising:

a reflecting element positioned on an inner surface of the tyre for reflecting an optical beam and comprising a region having at least one area of high light reflection and at least one area of low light reflection; and a moving station located in a predetermined position on the rim for sending the optical beam toward the inner surface, receiving one or more reflections of the optical beam from the inner surface or the reflecting element, and emitting a signal proportional to the deformations of the tyre in a longitudinal direction, in a transverse direction, and in a vertical direction.

2. The system of claim 1, further comprising a fixed station located on the vehicle for receiving the signal from the moving station.

3. The system of claim 1, wherein the at least one area of high light reflection is formed by coloring the inner surface of the tyre with reflective paint.

4. The system of claim 1, wherein the region comprises a plurality of triangles adjacent to each other.

5. The system of claim 2, wherein the fixed station enables a measurement made by the moving station.

6. The system of claim 1, wherein the moving station comprises at least one sensor comprising an electronic circuit board including an optical beam emitting device, a first lens, an optical beam receiving device, and a second lens.

7. The system of claim 2, wherein the fixed station comprises:

a supporting element fixed at one end to a hub on which the rim is mounted; and an electronic circuit board fixed to the supporting element.

8. The system of claim 7, wherein the electronic circuit board comprises:

an oscillator circuit supplying a drive circuit for a first antenna;

a radio-frequency receiver connected to the first antenna; and an electrical demodulator device connected to the radio-frequency receiver.

9. The system of claim 2, wherein the fixed station is powered by a battery of the vehicle.

10. The system of claim 6, wherein the electronic circuit board comprises:

a second antenna connected to a power supply unit which supplies a drive circuit for the optical beam emitting device;

a drive circuit for the optical beam receiving device; and a circuit for reading an electrical signal emitted by the optical beam receiving device.

11. The system of claim 6, wherein the optical beam emitting device comprises a light emitting diode (LED) or a laser diode.

12. The system of claim 6, wherein the optical beam receiving device comprises at least one charge coupled device (CCD) element or at least one complementary metal oxide semiconductor (CMOS) element.

13. A method for monitoring deformations of a moving tyre fitted on a rim associated with a vehicle, comprising the steps of:

emitting a signal within the tyre from a predetermined position on the rim;

reflecting the signal from an inner surface of the tyre or a reflecting element positioned on the inner surface, wherein the inner surface or the reflecting element comprises a region having at least one area of high light reflection and at least one area of low light reflection;

receiving the reflected signal; and processing the received signal to generate a signal proportional to the deformations of the tyre in a longitudinal direction, in a transverse direction, and in a vertical direction.

14. The method of claim 13, wherein the step of emitting a signal comprises:

enabling a moving station located on the rim to emit the signal when the moving station passes near a footprint area of the tyre.

15. The method of claim 13, further comprising the step of transferring the processed signal from the moving station to a fixed station located on the vehicle.

16. The method of claim 14, wherein the step of enabling the moving station is carried out by a fixed station.

17. The method of claim 14, wherein the step of enabling the moving station comprises supplying power to the moving station for a time interval during which a step of transferring the processed signal from the moving station to a fixed station is also carried out.

18. The method of claim 14, wherein the step of enabling the moving station comprises generating a magnetic field at a fixed station in a direction of the moving station and supplying power by means of the magnetic field to a drive circuit for an optical beam emitting device.

19. The method of claim 15, wherein the step of transferring the processed signal from the moving station to the fixed station comprises:

generating a magnetic field corresponding to the processed signal at the moving station in a direction of the fixed station;

converting the magnetic field to an electrical signal; and decoding the electrical signal to obtain a corresponding processed signal.

20. A wheel for a vehicle, comprising:

a tyre;

a supporting rim;

a moving station; and a reflecting element;

wherein the tyre is fitted on the supporting rim, wherein the moving station is located at a predetermined position on the rim, wherein the moving station sends an optical beam toward an inner surface of the tyre, receives the optical beam reflected from the inner surface, and transmits a signal proportional to deformations of the tyre in a longitudinal direction, in a transverse direction, and in a vertical direction, and wherein the reflecting element reflects the optical beam and is positioned on the inner surface and comprises a region having at least one area of high light reflection and at least one area of low light reflection.

* * * * *